Figure 1:
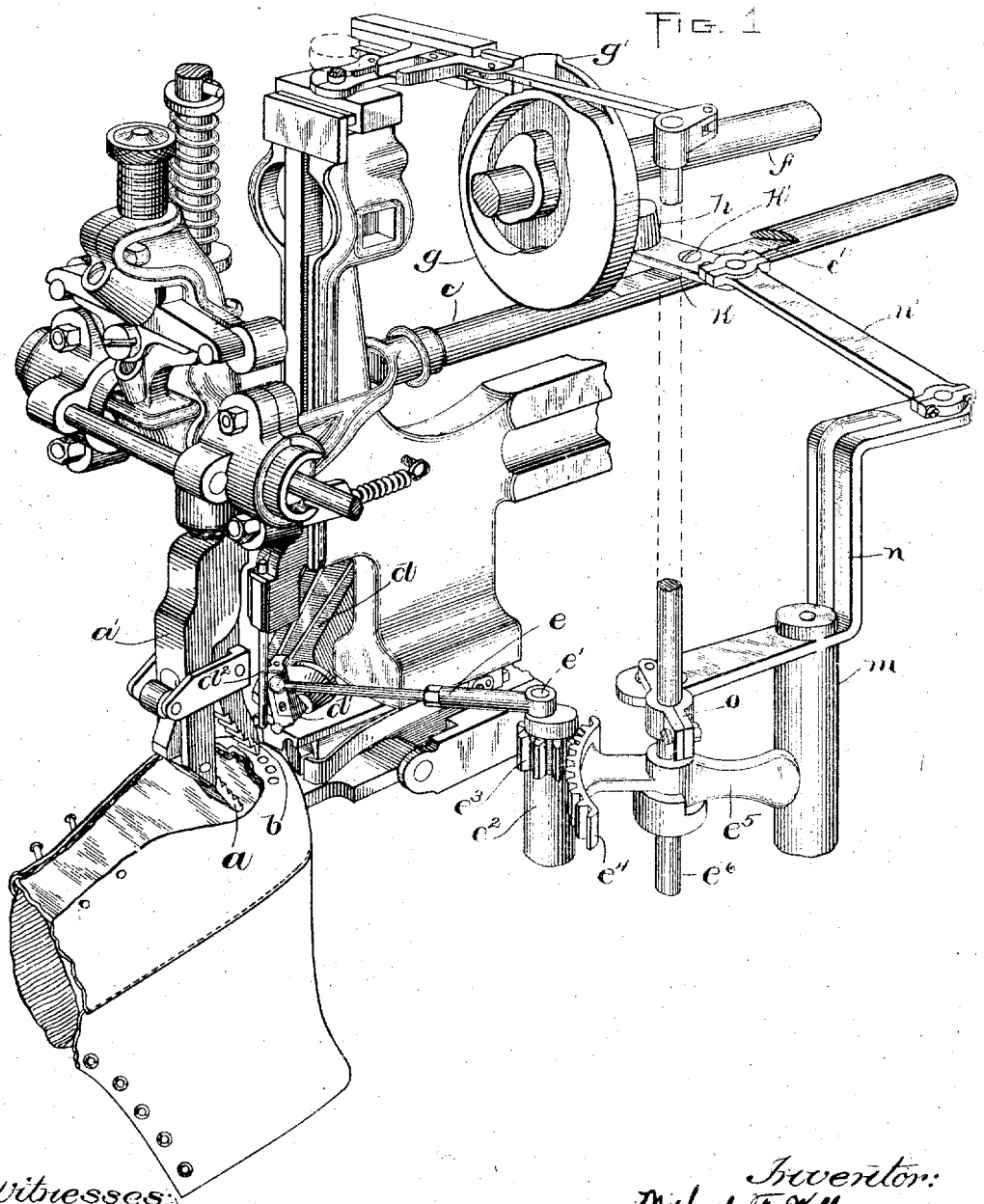

No. 12,012. Reissued July 15, 1902.

M. F. KELLEY.

LASTING MACHINE.

(Application filed May 22, 1902.)

2 Sheets—Sheet 1.

Witnesses:
Helen M. Halsted
Walter P. Abell.

Inventor:
Michael F. Kelley
by Wright Brown & Quinby
his att'ys.

No. 12,012. Reissued July 15, 1902.
M. F. KELLEY.
LASTING MACHINE.
(Application filed May 22, 1902.)
2 Sheets—Sheet 2.
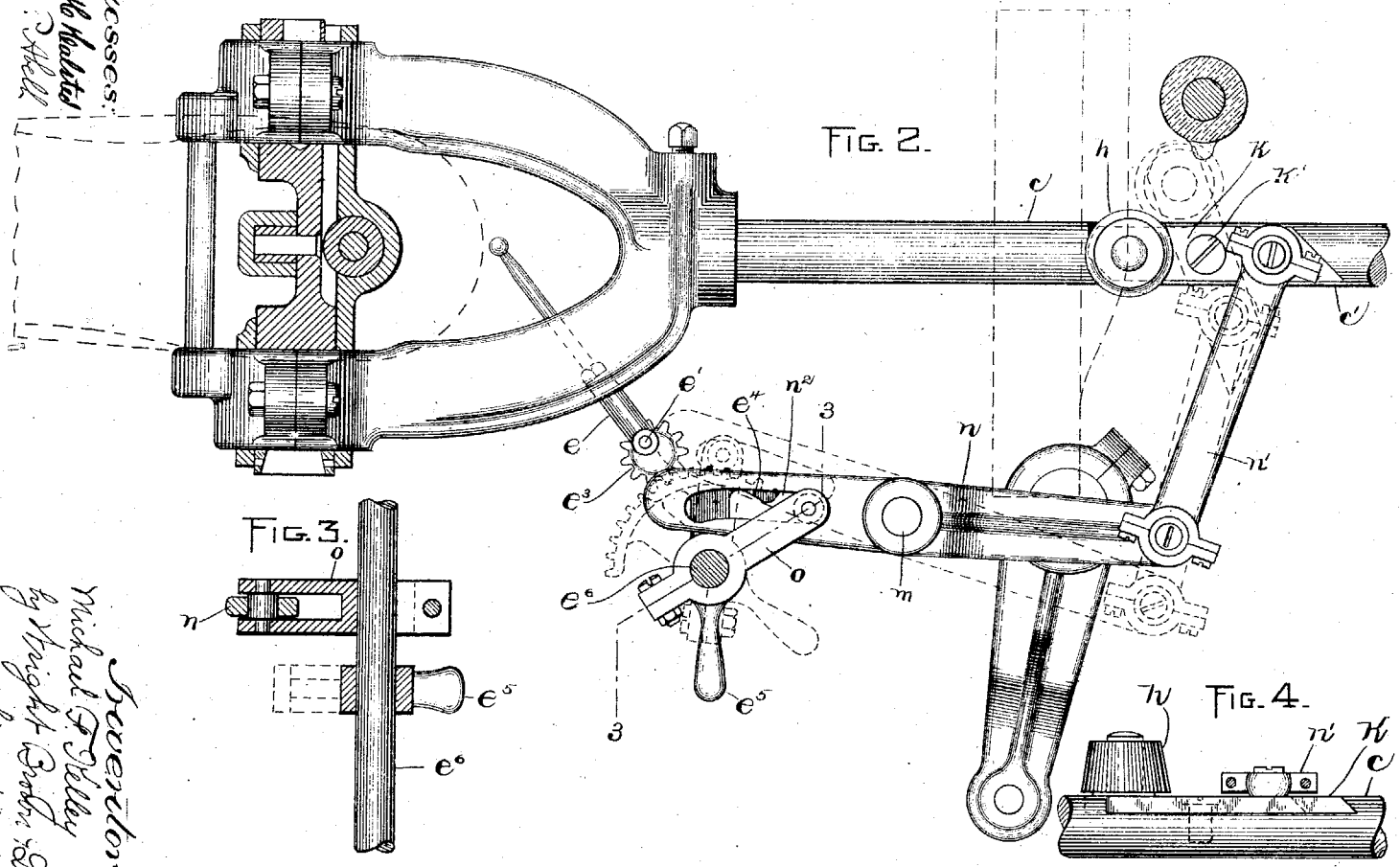
Witnesses:
Herbert H. Halsted
Walter P. Abell
Inventor:
Michael F. Kelley
by Wright Brown & Quinby
his att'ys.

UNITED STATES PATENT OFFICE.

MICHAEL F. KELLEY, OF BROCKTON, MASSACHUSETTS, ASSIGNOR TO THE UNITED SHOE MACHINERY COMPANY, OF PATERSON, NEW JERSEY, AND BOSTON, MASSACHUSETTS, A CORPORATION OF NEW JERSEY.

LASTING-MACHINE.

SPECIFICATION forming part of Reissued Letters Patent No. 12,012, dated July 15, 1902.

Original No. 693,720, dated February 18, 1902. Application for reissue filed May 22, 1902. Serial No. 108,609.

*To all whom it may concern:*

Be it known that I, MICHAEL F. KELLEY, of Brockton, in the county of Plymouth and State of Massachusetts, have invented certain new and useful Improvements in Lasting-Machines, of which the following is a specification.

This invention has relation to machines for lasting boots and shoes and belongs to the type of that illustrated in the patent to S. W. Ladd and R. F. McFeeley, No. 584,744, dated June 15, 1897. The machine illustrated and described in said patent comprises mechanism for engaging and drawing the upper taut around the last and across the insole and tacking mechanism for securing the edge of the upper in place. The tacking mechanism comprises means for automatically presenting to the action of the driver either of two kinds of tacks in accordance with the particular portion of the upper being secured to the insole. When the heel end of the shoe is being lasted, relatively short tacks are employed, while at the sides and shank of the shoe longer tacks are driven into place. In machines of the type referred to it is customary to employ lasting mechanism including continuously-operated pincers for drawing the upper around the edge of the insole at the sides and the toe. Since it is not desirable to draw the upper over the heel by the pincers, the operative usually moves the heel away from the latter at each reciprocation thereof to prevent the edge of the upper being engaged thereby. As illustrated in said patent, the pincers move not only toward and from the insole, which is placed below them, but also in a plane substantially parallel to that of said insole, said pincers being drawn toward the upper and being then moved in the opposite direction to force the edge of the upper across the insole. The effort on the part of the operator to prevent the pincers from engaging the upper during the operation of tacking the heel end of the shoe prevents the tacks from being properly driven in place and frequently permits the marring and injuring of the shoe.

The object of the present invention, therefore, is to provide a mechanism for throwing the pincers out of operation during the time that the heel is being tacked, and I connect the mechanism for accomplishing this result with the device by which the feeding of tacks to the driver is regulated, so that when the operative in lasting a shoe reaches the heel end and moves the lever to cause the feeding of the smaller tacks to the driver the pincers are automatically thrown out of operation and reciprocate vertically without engaging the edge of the upper.

I have not illustrated the whole machine upon the drawings, for it is shown with the greatest detail in the patent referred to, preferring to illustrate only the mechanism which embodies my present invention.

On the said drawings, therefore, Figure 1 illustrates in perspective view a portion of a lasting-machine including the pincers, a part of the pincer-operating mechanism, the controller for the tacks, and the means whereby the pincers are thrown out of operation during the tacking of the heel. Fig. 2 represents a detail plan view of the same, partly in section. Fig. 3 represents a section on the line 3 3 of Fig. 2. Fig. 4 represents the movable roller on the reciprocatory shaft.

On the drawings, $a$ indicates the fixed jaw of the pincers, which is secured to the bar $a'$, and $b$ represents the movable jaw, which is closed upon the stationary jaw by the mechanism described in the patent referred to. The said pincers are reciprocated vertically by suitable mechanism, also described in said patent and constituting one of the parts of what is hereinafter referred to as a "two-part pincer-operating mechanism." The pincers are drawn toward the edges of the insole to engage the upper by a reciprocatory shaft $c$, which is bifurcated, as shown, and connected to the pincer mechanism.

$d$ represents the chutes or guideways for the two sets of tacks, and $d'$ illustrates the device by means of which either set of tacks is permitted to flow to the driver $d^2$. The element $d'$ is connected to a bar $e$, engaged at its end with a crank-pin $e'$, projecting up from a rock-shaft $e^2$, having a pinion $e^3$, engaged with a segment-gear $e^4$ on the end of a lever $e^5$, rigidly secured to a rock-shaft $e^6$. This mechanism constitutes what I term the "controller" for the tacks.

On a rotary shaft $f$ is a cam $g$, which actuates the pincers, said cam having a portion $g'$ to engage a roll $h$, carried by the reciprocatory shaft $c$ for moving said shaft to laterally reciprocate the pincers. As thus far described the mechanism is not different from that described in Patent No. 584,744.

According to the present invention the shaft $c$ is flattened, as at $c'$, to receive a centrally-fulcrumed lever $k$, which carries at one end the roll $h$. Normally the lever $k$ rests longitudinally of the shaft $c$, as shown in full lines in Fig. 2, and hence during each reciprocation of the cam $g$ the roll $h$ is engaged by the portion $g'$ and the shaft $c$ is reciprocated to swing the pincers laterally, whereby they may engage the upper to draw it taut across the insole. I provide mechanism, however, for swinging said lever $k$ around its fulcrum $k'$ automatically when the operator actuates the lever $e^5$ to permit the feeding of the shorter tacks when lasting the heel. On an upright shaft $m$ I fulcrum a lever $n$, which is bent upward and outward at its longer end and connected with the end of lever $k$ by a connecting-rod $n'$. The other end of lever $n$ is provided with a slot $n^2$ to receive a pin and roller extending downwardly from an arm $o$, rigidly clamped to the upright shaft $e^6$, upon which the lever $e^5$, before referred to, is rigidly secured. Hence it will be seen that when the shaft $e^6$ is rocked during the operation of changing the flow of tacks to the driver when the lasting of the heel is about to begin the roll $h$ is thrown out of the path of the portion $g'$ of the cam $g$, and the pincers are prevented from swinging laterally and are therefore thrown out of operation, being reciprocated vertically without engaging the upper.

The reciprocatory shaft $c$, the cam $g$, and the roll $h$ constitute one part of the before-mentioned two-part pincer-operating mechanism, the roll $h$ being a displaceable member, whereby the said part is made inoperative, and the pincers are thereby prevented from engaging the upper without affecting the other movement of the pincers. Hence the pincers are adapted to be quickly made inoperative and as quickly made operative, the changes being made much more rapidly and with less complication of mechanism than would be possible if both movements of the pincers were interrupted.

Having thus explained the nature of the invention and described a way of constructing and using the same, although without attempting to set forth all of the forms in which it may be made or all of the modes of its use, I declare that what I claim is—

1. A machine of the class described, comprising pincers, operating mechanism for moving the pincers longitudinally toward and from the inner sole and laterally toward and from the edge of the inner sole, and means for making said operating mechanism partially inoperative to prevent the pincers from grasping the upper.

2. A machine of the character referred to, comprising pincers, operating mechanism for moving the pincers longitudinally toward and from the insole as held by the operator and laterally toward and from the edge of the inner sole, and means for making said operating mechanism partially inoperative to discontinue one of said movements and prevent the pincers from grasping the upper.

3. A machine of the character referred to, comprising pincers, a two-part operating mechanism therefor, one of said parts moving the pincers longitudinally toward and from the insole as held by the operator, and the other to move the pincers laterally toward and from the edge of the insole, and means for making one of said parts inoperative, whereby the pincers are prevented from grasping the upper.

4. A machine of the character referred to, comprising pincers, a two-part operating mechanism therefor, one of said parts moving the pincers longitudinally toward and from the position in which the insole is held by the operator, while the other moves the pincers laterally toward and from the edge of the insole, and means for making the last-mentioned part inoperative to discontinue the lateral movement of the pincers without affecting their longitudinal movement.

5. A machine of the character referred to, comprising pincers reciprocated longitudinally toward and from the work, mechanism for moving the pincers laterally, and means for disconnecting the pincers from said mechanism without affecting the longitudinal movement of the pincers.

6. A machine of the character referred to, comprising pincers, a two-part operating mechanism therefor, one of said parts moving the pincers longitudinally while the other moves the pincers laterally, tacking mechanism organized to supply either longer or shorter tacks at will, and including a tack-feeding controller, and connections between said controller and a member of one of the parts of said operating mechanism, whereby one of the movements of the pincers is discontinued when the controller is operated to supply the shorter tacks, and resumed when the controller is operated to supply the longer tacks.

7. A machine of the character referred to, comprising pincers reciprocated toward and from the work, a reciprocatory shaft for moving said pincers laterally to engage the upper and draw it over on the insole, a rotary cam, a roll carried by said shaft, tacking mechanism including a tack-feed controller, and connections between said roll and controller, whereby the roll is moved into and out of engagement with the cam when said controller is operated.

8. A machine of the character referred to, comprising pincers reciprocated toward and from the work, a reciprocatory shaft for moving said pincers laterally to engage the upper and draw it over on the insole, a rotary cam, a movable lever on said shaft, a roll carried by said lever and movable thereby into and out of the path of the cam, tacking mechanism including a tack-feed controller, and connections between said lever and controller, whereby the roll is moved into and out of engagement with the cam when said controller is operated.

9. A machine of the character referred to, comprising pincers, a shaft *c* for actuating the pincers, a cam *g*, a lever *h* carried by the shaft *c* and normally parallel therewith, a roll *h'* movable into and out of the path of the cam *g*, and means for moving said roll, whereby said pincers may be entirely disconnected from said shaft.

10. A machine of the character referred to, comprising pincers, a shaft *c* for actuating the pincers, a cam *g*, a lever *h* carried by the shaft *c* and having a roll *h'* movable into and out of the path of the cam *g*, and a hand-lever connected to the said lever *h* for actuating it, whereby said roll may be moved out of the path of said cam to disconnect said pincers from said shaft *c*.

11. A machine of the class described, comprising pincers, operating mechanism for causing the pincers to pull the upper, tack-supplying mechanism organized to supply tacks of different sizes, and connections between said tack-supplying mechanism and the mechanism for operating the pincers, whereby when the size of tacks supplied is changed the pincers-operating mechanism is rendered partially inoperative to prevent the pincers from pulling the upper.

12. A machine of the character referred to, comprising pincers, operating mechanism for moving said pincers longitudinally and laterally to engage and pull the upper, tacking mechanism organized to supply either longer or shorter tacks at will and including a tack-controller, and connections between said controller and said operating mechanism, whereby one of the described movements of said pincers is discontinued when the controller is operated to supply the shorter tacks.

In testimony whereof I have affixed my signature in presence of two witnesses.

MICHAEL F. KELLEY.

Witnesses:

LOUIS H. BAKER,

NELSON W. HOWARD.